US010859389B2

(12) United States Patent
Sunil Kumar et al.

(10) Patent No.: US 10,859,389 B2
(45) Date of Patent: Dec. 8, 2020

(54) METHOD FOR GENERATION OF A SAFE NAVIGATION PATH FOR A VEHICLE AND SYSTEM THEREOF

(71) Applicant: WIPRO LIMITED, Bangalore (IN)

(72) Inventors: Balaji Sunil Kumar, Bengaluru (IN); Manas Sarkar, Kolkata (IN)

(73) Assignee: Wipro Limited, Bangalore (IN)

( * ) Notice: Subject to any disclaimer, the term of this patent is extended or adjusted under 35 U.S.C. 154(b) by 278 days.

(21) Appl. No.: 15/900,858

(22) Filed: Feb. 21, 2018

(65) Prior Publication Data
US 2019/0204098 A1 Jul. 4, 2019

(30) Foreign Application Priority Data
Jan. 3, 2018 (IN) .............................. 201841000280

(51) Int. Cl.
*G01C 21/34* (2006.01)
*G05D 1/00* (2006.01)
(Continued)

(52) U.S. Cl.
CPC .......... *G01C 21/3461* (2013.01); *B60W 30/10* (2013.01); *G01C 21/20* (2013.01);
(Continued)

(58) Field of Classification Search
CPC ........................ G01C 21/3461; G01C 21/20; G01C 21/3446; B60W 30/10; B60W 30/12; G05D 1/0088; G05D 1/0214; G05D 1/0257
See application file for complete search history.

(56) References Cited

U.S. PATENT DOCUMENTS 5,375,059 A * 12/1994 Kyrtsos .............. B60K 31/0008
342/357.24
5,555,503 A * 9/1996 Kyrtsos ................... G01S 19/11
342/357.24
(Continued)

FOREIGN PATENT DOCUMENTS

EP 0 354 561 A2 2/1990

OTHER PUBLICATIONS

Extended European Search Report issued in the European Patent Office in counterpart European Application No. 18164088.9, dated Oct. 31, 2018, 12 pages.
(Continued)

*Primary Examiner* — Behrang Badii
*Assistant Examiner* — Daniel L Greene
(74) *Attorney, Agent, or Firm* — Finnegan, Henderson, Farabow, Garrett & Dunner, LLP

(57) ABSTRACT

The present disclosure relates to generation of a safe navigation path for a vehicle. The safe navigation path is generated by a navigation path generation system. The navigation path generation system receives a reference path from a source location to a destination location. Further, generates scan lines from the reference path to the boundaries present on either side of the reference path. Further, the navigation path generation system generates segment along the boundaries. Further, using the generated segments the navigation path generation system generates a safe navigation path along the centre, between the boundaries present on either side of the reference path. Navigation of the vehicle along the safe path ensures the safety of the vehicle and the people in the vehicle especially when the vehicle is an autonomous or semi-autonomous vehicle.

16 Claims, 9 Drawing Sheets

(51) Int. Cl.
  *G05D 1/02* (2020.01)
  *B60W 30/10* (2006.01)
  *G01C 21/20* (2006.01)

(52) U.S. Cl.
  CPC ....... *G01C 21/3446* (2013.01); *G05D 1/0088* (2013.01); *G05D 1/0214* (2013.01); *G05D 1/0257* (2013.01); *G05D 2201/0212* (2013.01); *G05D 2201/0213* (2013.01)

(56) References Cited

U.S. PATENT DOCUMENTS

| | | | | |
|---|---|---|---|---|
| 8,050,863 | B2* | 11/2011 | Trepagnier | B60W 30/00 180/167 |
| 8,386,110 | B2 | 2/2013 | Maekawa et al. | |
| 8,744,746 | B2 | 6/2014 | Mäkelä | |
| 9,329,596 | B2 | 5/2016 | Cima | |
| 2007/0046677 | A1* | 3/2007 | Hong | G05B 19/41 345/442 |
| 2010/0157430 | A1* | 6/2010 | Hotta | G02B 27/01 359/630 |
| 2011/0187515 | A1 | 8/2011 | Saito et al. | |
| 2012/0127169 | A1* | 5/2012 | Barcay | G06T 15/20 345/419 |
| 2015/0117723 | A1 | 4/2015 | Joshi et al. | |
| 2015/0345959 | A1* | 12/2015 | Meuleau | G05D 1/0088 701/23 |
| 2019/0035101 | A1* | 1/2019 | Kwant | G06K 9/00798 |

OTHER PUBLICATIONS

K.B. Lee, et al., "Lane-following method for high speed autonomous vehicles", *M.H. Int. J Automat. Technol.*, Oct. 2008, vol. 9, issue 5, pp. 607-613. Abstract, 4 pages.

Huang, A.S., "Lane Estimation for Autonomous Vehicles using Vision and LIDAR", *MIT*, Feb. 2010, 114 pages.

\* cited by examiner

METHOD FOR GENERATION OF A SAFE NAVIGATION PATH FOR A VEHICLE AND SYSTEM THEREOF

TECHNICAL FIELD

The present disclosure relates to navigation of vehicles. Particularly, but not exclusively, the present disclosure relates to a method and a system for generating a safe navigation path for a vehicle.

BACKGROUND

Vehicle, in particular autonomous vehicles (driverless vehicle) or semi-autonomous vehicles use data obtained from various sensors to navigate through a path. Also, various techniques are used to detect obstacles in the surroundings of the vehicle. The autonomous vehicles or semi-autonomous vehicles have a central control unit that analyse the data obtained from the sensors and helps the vehicle to traverse a path to reach a destination location from a source location. Also, the central control unit detects any obstacles and manoeuvres the obstacles by traversing the vehicle in an alternate path. The existing autonomous and semi-autonomous vehicles make use of a path determined by a dedicated path planning module. In few scenarios, the path planning module present in existing autonomous and semi-autonomous vehicles may produce a path that may be generated close to dividers or walls along a road or obstacles, even when a path could be generated along the centre of the road. Further, when a path is generated close to obstacle, the existing autonomous and semi-autonomous vehicles may experience difficulty in manoeuvring obstacles as there may not be enough space. Also, when a path in which the vehicle is traveling has a steep curve, the vehicle may not be able to traverse the curve easily when a path is not generated along the centre of the steep curve. Thus, existing autonomous vehicles does not provide an efficient solution to address the above-mentioned problems.

The information disclosed in this background of the disclosure section is only for enhancement of understanding of the general background of the invention and should not be taken as an acknowledgement or any form of suggestion that this information forms the prior art already known to a person skilled in the art.

SUMMARY in an embodiment, the present disclosure relates to a method for generating safe navigation path for a vehicle. The method comprises receiving by a navigation path generation system, a reference path between a source and a destination. The reference path is confined between a left boundary and a right boundary. The method further comprises generating a plurality of left scan lines and a plurality of right scan lines originating from the reference path, with respect to an axis of a pre-defined axis of orientation. An end point of each of the plurality of left scan lines meets the left boundary and an end point of each of the plurality of right scan lines meets the right boundary. The method further comprises generating one or more left segments along the left boundary, based on the end point of each of the plurality of left scan lines and one or more right segments along the right boundary, based on the end point of each of the plurality of right scan lines. Further, the method comprises projecting a perpendicular stretch from a centre of each of the one or more left segments to the right boundary and a perpendicular stretch from a centre of each of the one or more right segments to the left boundary. Thereafter, the method comprises determining a centre point of the perpendicular stretch projected from the centres of each of the one or more left and right segments. Lastly, the method comprises generating the safe navigation path for the vehicle based on the centre point of the perpendicular stretch projected from the centres of each of the one or more left and right segments.

In an embodiment, the present disclosure relates to a navigation path generation system for generating a safe navigation path for a vehicle, the navigation path generation system comprises an Electronic Control Unit (ECU). The ECU is configured to receive a reference path between a source and a destination. The reference path is confined between a left boundary and a right boundary. The ECU is further configured to generate a plurality of left scan lines and a plurality of right scan lines originating from the reference path, with respect to an axis of pre-defined axis of orientation, An end point of each of the plurality of left scan lines meets the left boundary and an end point of each of the plurality of right scan lines meets the right boundary. The ECU is further configured to generate one or more left segments along the left boundary, based on the end point of each of the plurality of left scan lines and one or more right segments along the right boundary, based on the end point of each of the plurality of right scan lines. Thereafter, a perpendicular stretch is projected from a centre of each of the one or more left segments to the right boundary and a perpendicular stretch from a centre of each of the one or more right segments to the left boundary, a centre point of the perpendicular stretch projected from the centres of each of the one or more left and right segments is determined and the safe navigation path is generated for the vehicle based on the centre point of the perpendicular stretch projected from the centres of each of the one or more left and right segments.

In an embodiment, the present disclosure relates to a non-transitory computer readable medium including instruction stored thereon that when processed by at least one processor cause a navigation path generation system to receive a reference path between a source and a destination. The reference path is confined between a left boundary and a right boundary. The instructions may cause the processor to generate a plurality of left scan lines and a plurality of right scan lines originating from the reference path, with respect to an axis of pre-defined axis of orientation. An end point of each of the plurality of left scan lines meets the left boundary and an end point of each of the plurality of right scan lines meets the right boundary. The instructions may cause the processor to generate one or more left segments along the left boundary, based on the end point of each of the plurality of left scan lines and one or more right segments along the right boundary, based on the end point of each of the plurality of right scan lines, project a perpendicular stretch from a centre of each of the one or more left segments to the right boundary and a perpendicular stretch from a centre of each of the one or more right segments to the left boundary, determining a centre point of the perpendicular stretch projected from the centres of each of the one or more left and right segments and generate the safe navigation path for the vehicle based on the centre point of the perpendicular stretch projected from the centres of each of the one or more left and right segments.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
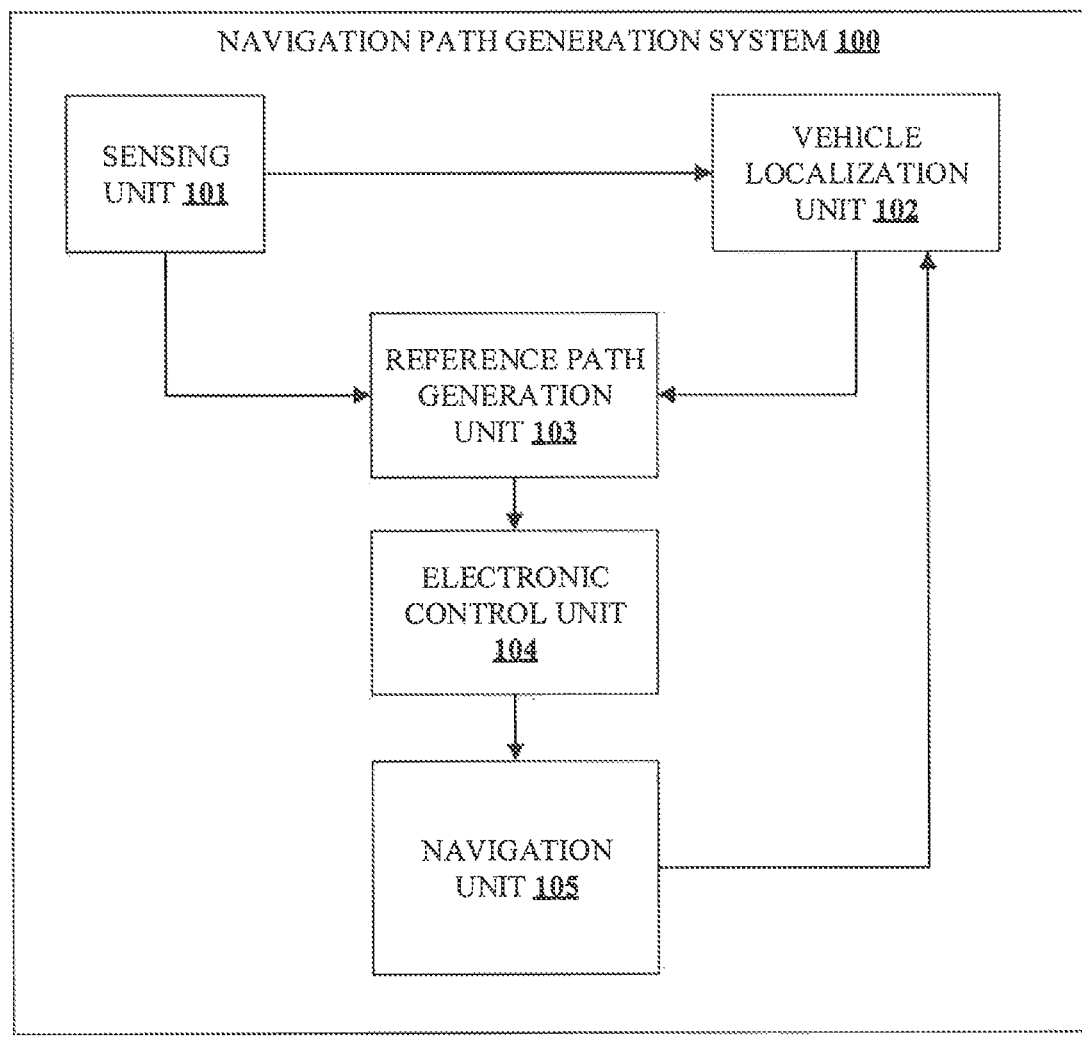
FIG. 1 illustrates an exemplary block diagram of a navigation path generation system for generating a safe navigation path for a vehicle, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to generation of a safe navigation path for a vehicle. The safe navigation path is generated by a navigation path generation system. The navigation path generation system receives a reference path comprising a source location to a destination location. Further, the navigation path generation system generates scan lines from the reference path to the boundaries present on either side (left and right side) of the reference path. Further, the navigation path generation system generates segments along the boundaries on either side of the reference path based on the scan lines and path properties. Further, a perpendicular is drawn from centre of each of the segments to the boundary present on the opposite side of the corresponding segment. Using a centre point of the perpendiculars, the navigation path generation system generates a safe navigation path, between the boundaries present on either side of the reference path.

FIG. 1 illustrates an exemplary block diagram of a navigation path generation system 100 for generating a safe navigation path for a vehicle, in accordance with some embodiments of the present disclosure. The navigation path generation system 100 comprises a sensing unit 101, a vehicle Localization unit 102, a reference path generation unit 103, an electronic control unit 104 and a navigation unit 105. In an embodiment, the sensing unit 101 may comprise variety of sensors used for sensing the environment and surroundings of the vehicle. Various techniques, employing the variety of sensors may include, but are not limited to, camera imaging, Radio Detection and Ranging (RADAR), Light Detection and Ranging (LIDAR), Global Positioning System (GPS), odometry and computer vision. The various techniques employed by the sensing unit 101 provides information about the surroundings and environment of the vehicle. The information may include, but not limited to, location of vehicle, location of obstacles around the vehicle, distance of an obstacle from the vehicle and any other environmental parameter. A map generator unit (not shown) may receive data from the sensing unit 101 to generate a static map using one of the various techniques employed for sensing. In an embodiment, the static map may be generated using LIDAR data. The static map may be generated using existing techniques or any techniques that may be employed to generate the static map. The vehicle localization unit 102 may obtain information from the sensing unit 101 and may also receive information on speed of the vehicle from the navigation unit 105 and determines an initial position of the vehicle. Further, the vehicle localization unit 102 may determine a path for the vehicle based on the initial position of the vehicle and the static map produced. The path may be used by the vehicle for navigation. Further, the vehicle localization unit 102 may also determine the orientation of the vehicle with respect to the path. The static map mentioned here, may refer to the LIDAR based static map obtained from the sensing unit 101. The reference path generation unit 103 receives the static map from the sensing unit 101 and receives data from the vehicle localization unit 102. Further, based on the static map, the reference path generation unit 103 may generate a reference path between a source location and a destination location. The source location is obtained from the vehicle localization unit 102. In an embodiment, the destination location may further be obtained from a user input. The reference path generation unit 103 may generate the reference path between the source location and destination location based on parameters obtained from the sensing unit 101 and the vehicle localization unit 102. The parameters may include, but not limited to, speed of the vehicle, initial position of the vehicle, orientation of the vehicle, Field of View (FOV) of the sensors employed in the sensing unit 101 and the like.

In an embodiment, road which joins the source location and the destination location may be considered. The reference path generated by the reference path generation unit 103 may be a random navigation path along the road joining, the source location and the destination location. The generated reference path may be confined between a boundary on the left side and a boundary on the right side. The boundary on the left side may be referred to as left boundary and the left boundary may be a path along the left edge of the road. The boundary on the right side may be referred to as right boundary and the right boundary may be a path along the right edge of the road.

In an embodiment, the reference path along with left boundary and right boundary is received by the ECU 104. The ECU 104 generates scan lines from the reference path to the left boundary and the right boundary. Further, the ECU 104 determines one or more segments along the left boundary and the right boundary. Furthermore, using the one or more segments the ECU 104 generates a safe navigation path along the centre of the road. The safe navigation path may be a path along the centre of the road joining the source location and the destination location and may be used by the vehicle to navigate from the source location to the destination location safely. In an embodiment, the safe navigation path may be a straight path, a curved path, a combination of straight and curved path or any other kind of path. However, the safe path may always be a path along the centre of the road of defined boundaries. The navigation unit 105 receives the safe navigation path and enables the vehicle to navigate from the source location to the destination location.

In an embodiment, the one or more sensors employed by the sensing unit 101 may include, but are not limited to, a LIDAR sensor, an ultrasound sensor, a camera, a proximity sensor and the like.

Figure 2:
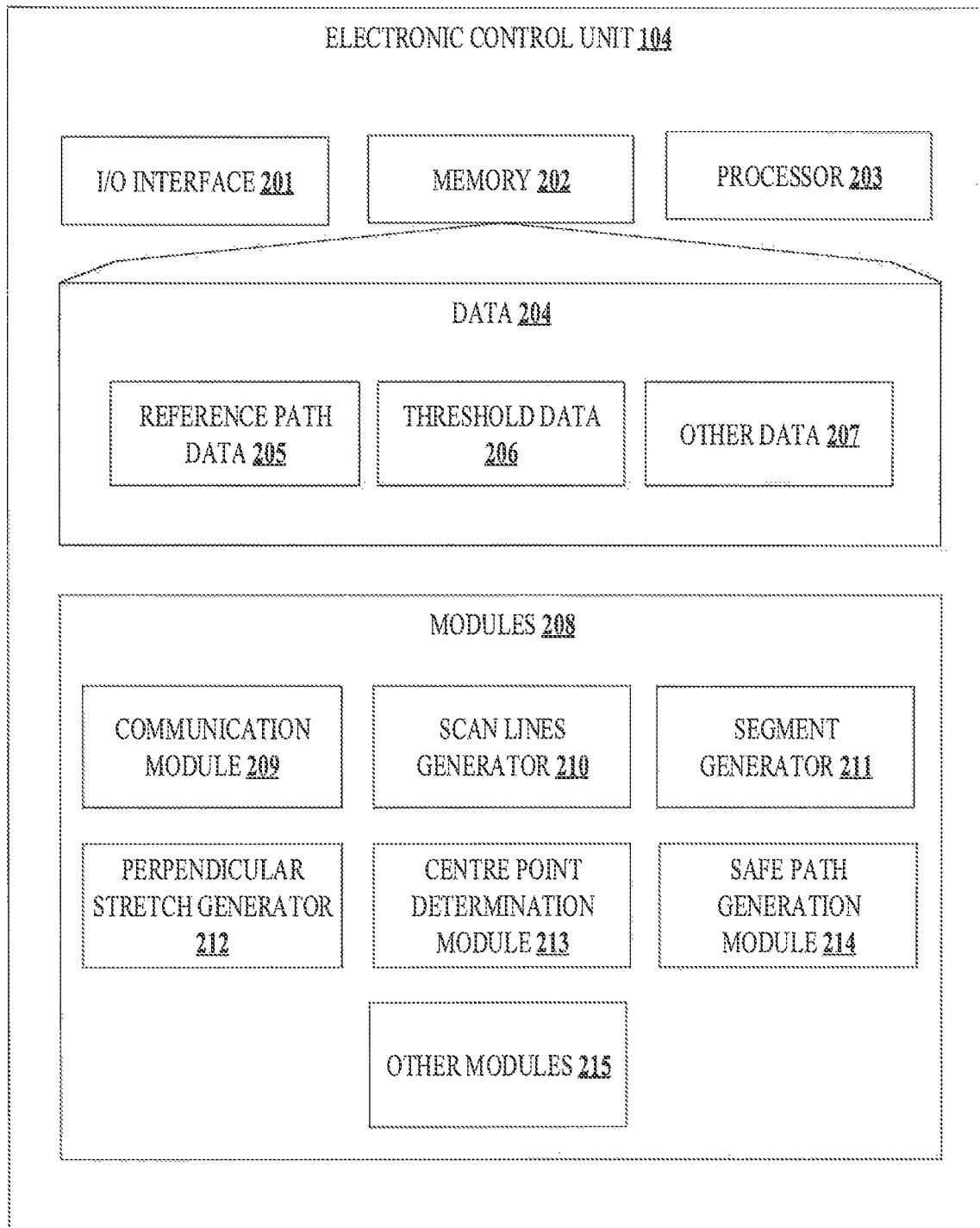
FIG. 2 illustrates a block diagram of internal architecture of an Electronic Control Unit (ECU) configured to generate a safe navigation path for a vehicle, in accordance with some embodiments of the present disclosure.

FIG. 2 illustrates internal architecture of the ECU 104 in accordance with some embodiments of the present disclosure. The ECU 104 may include at least one Central Processing Unit ("CPU" or "processor") 203 and a memory 202 storing instructions executable by the at least one processor 203. The processor 203 may comprise at least one data processor for executing program components for executing user or system-generated requests. The memory 202 is communicatively coupled to the processor 203. The ECU 104 further comprises an Input/Output (I/O) interface 201. The I/O interface 201 is coupled with the processor 203 through which an input signal or/and an output signal is communicated.

In an embodiment, data 204 may be stored within the memory 202. The data 204 may include, for example, a reference path data 205, a threshold data 206 and other data 207.

In an embodiment, the reference path data 205 may include information about the reference path generated by the reference path generation unit 103. The reference path data 205 may include the source location, the destination location, length of the generated reference path, distance of left boundary and the right boundary from the reference path, and co-ordinates of various points involved in the formation of the generated reference path.

In an embodiment, the threshold data 206 may include information about the different thresholds used in the process of generating the safe navigation path. The threshold data 206 may include length interval of the reference path for generating the scan lines, angular threshold and segment length threshold. In an embodiment, the length interval of the reference path for generating the scan lines, angular threshold and segment length threshold may be referred to as path properties. The length interval of the reference path indicates the length interval of the reference path for which scan lines are generated, originating from the reference path to the left boundary and the right boundary present on either side of the reference path. The angular threshold indicates the maximum angular deviation between any two segments of the one or more left segments and any two segments of the one or more right segments. Each of the one or more left segments and right segments may be a straight line, generated based on the deviation angle between each of the one or more left and right segments and a corresponding reference segment. The segment length threshold indicates the maximum limit on length of each of the one or more left segments and right segments.

In an embodiment, the other data 207 may comprise, but is not limited to, obstacle data, traffic information, terrain information, and the like. The obstacle data may indicate information on the obstacles present along the reference path. For example, the one or more obstacles in the reference path or the safe navigation path may be a wall or a divider. In another embodiment, the one or more obstacles may be a person or another vehicle.

In an embodiment, the data 204 in the memory 202 is processed by modules 208 of the ECU 104. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 208 when configured with the functionality defined in the present disclosure will result in a novel hardware.

In one implementation, the modules 208 may include, for example, a communication module 209, scan lines generator 210, a segment generator 211, a perpendicular stretch generator 212, a centre point determination module 213, a safe path generation module 214 and other modules 215. It will be appreciated that such aforementioned modules 208 may be represented as a single module or a combination of different modules. Further, person of ordinary skill in the art will appreciate that in an implementation, the modules 208 may be integrated with the memory 202.

The communication module 209 facilitates communication between the ECU 104 and other units (not shown in figures) of the vehicle. In an embodiment, the other units may comprise, but are not limited to, the sensing unit 101, the vehicle localization unit 102, the reference path generation unit 103, and the navigation unit 105. For example, the communication module 209 may receive the reference path from reference path generation unit 103. In an embodiment, the communication module 209 may help in communication between the other units.

In an embodiment, the scan lines generator 210 generates scan lines. The scan lines generator 210 receives the reference path from the communication module 209. The reference path is confined between the left boundary and the right boundary. The scan lines generator 210 generates a plurality of left scan lines and a plurality of right scan lines from the reference path, with respect to an axis of pre-defined axis of rotation. In an embodiment, the plurality of left scan lines and right scan lines may also be generated taking into consideration the orientation of the reference path. Consider an instance where a road following a straight path has steep curve towards the left, in such a case the reference path may also be oriented towards the left as the road follows a steep curve towards the left. Thus, plurality of left and right scan lines originating from the reference path along the curve may be generated in the vertical direction (negative and positive 'y' direction, respectively, considering the conventional x-y co-ordinate plane). Consider another instance, where a road follows a straight path. Hence the plurality of left and right scan lines originating from the reference path along the straight path may be generated in the horizontal direction (negative and positive and 'x' direction, respectively). Further, an end point of each of the plurality of left scan lines meets the left boundary. Also, an end point of each of the plurality of right scan lines meets the right boundary. The end point of each of the plurality of left scan lines lie on the left boundary and the end point of each of the plurality of right scan lines lie on the right boundary.

In an embodiment, the plurality of left and right scan lines may be generated at regular intervals on the reference path. The length interval may be obtained from the threshold data 206. In another embodiment, the plurality of left and right scan lines may be generated at random intervals on the reference path.

In an embodiment, the segment generator 211 generates one or more left segments and one or more right segments. The one or more left segments are generated along the left boundary based on at least the end point of each of the plurality of left scan lines intersecting the left boundary. Further, the one or more right segments are generated along the right boundary based on at least the end point of each of the plurality of right scan lines intersecting the right boundary. At least two end points of the plurality of left and right scan lines are connected using a straight line to generate a left segment and a right segment respectively. The angular threshold and segment length threshold present in the threshold data 206 are considered while generating each of the one or more left and right segments. Each of the one or more left and right segments may be a straight line, generated based on the deviation angle between each of the one or more left and right segments and a corresponding reference segment. The deviation angle between each of the one or more left and right segments and the corresponding reference segment may be restricted to be within the angular threshold. Further, the length of each of the one or more left and right segments may be restricted to be within the segment length threshold.

In an embodiment, the perpendicular stretch generator 212 projects perpendicular stretches. The perpendicular stretch generator 212 receives the one or more left and right segments along the left boundary and the right boundary respectively, and projects a perpendicular stretch from a centre of each of the one or more left segments to the right boundary and a perpendicular stretch from a centre of each of the one or more right segments to the left boundary. In an embodiment, perpendicular stretches may be projected from any point on each of the one or more left segments to the right boundary and perpendicular stretches may be projected from any point on each of the one or more right segments to the left boundary.

In an embodiment, the perpendicular stretch generator 212, may project a perpendicular stretch from a centre of each of the one or more left segments to at least one of the one or more right segments, when the at least one of the one or more right segments are aligned along the right boundary. Further, the perpendicular stretch generator 212, may project a perpendicular stretch from a centre of each of the one or more right segments to at least one of the one or more left segments, when the at least one of the one or more left segments are aligned along the left boundary.

In an embodiment, the centre point determination module 213, determines Centre points. The centre point determination module 213, determines the centre point of each of the perpendicular stretches projected from the centre of each of the one or more left segments to at least one of the one or more right segments and the perpendicular stretches projected from the centre of each of the one or more right segments to at least one of the one or more left segments. Thus, one or more centre points are formed by the perpendicular stretches.

In an embodiment, the safe path generation module 214, generates a safe path. The safe path may be generated by serially connecting the one or more centre points determined by the centre point determination module 213. In an embodiment, the one or more centre points may be curve fitted to generate the safe path along the centre of the road between the left boundary and the right boundary.

In an embodiment, the other modules 215 may include, but is not limited to, an indication module to indicate the safe path generated by the ECU 104, etc. The indication module may display the safe path generated to a user. The indication module may be one of, but not limited to a monitor, a Liquid Crystal Display (LCD), a Light Emitting Diode (LED) display and/or any other module present which is capable of displaying an output. In an embodiment the indication module may be present in a user device, wherein the user may utilize the safe path for navigation.

Figure 3:
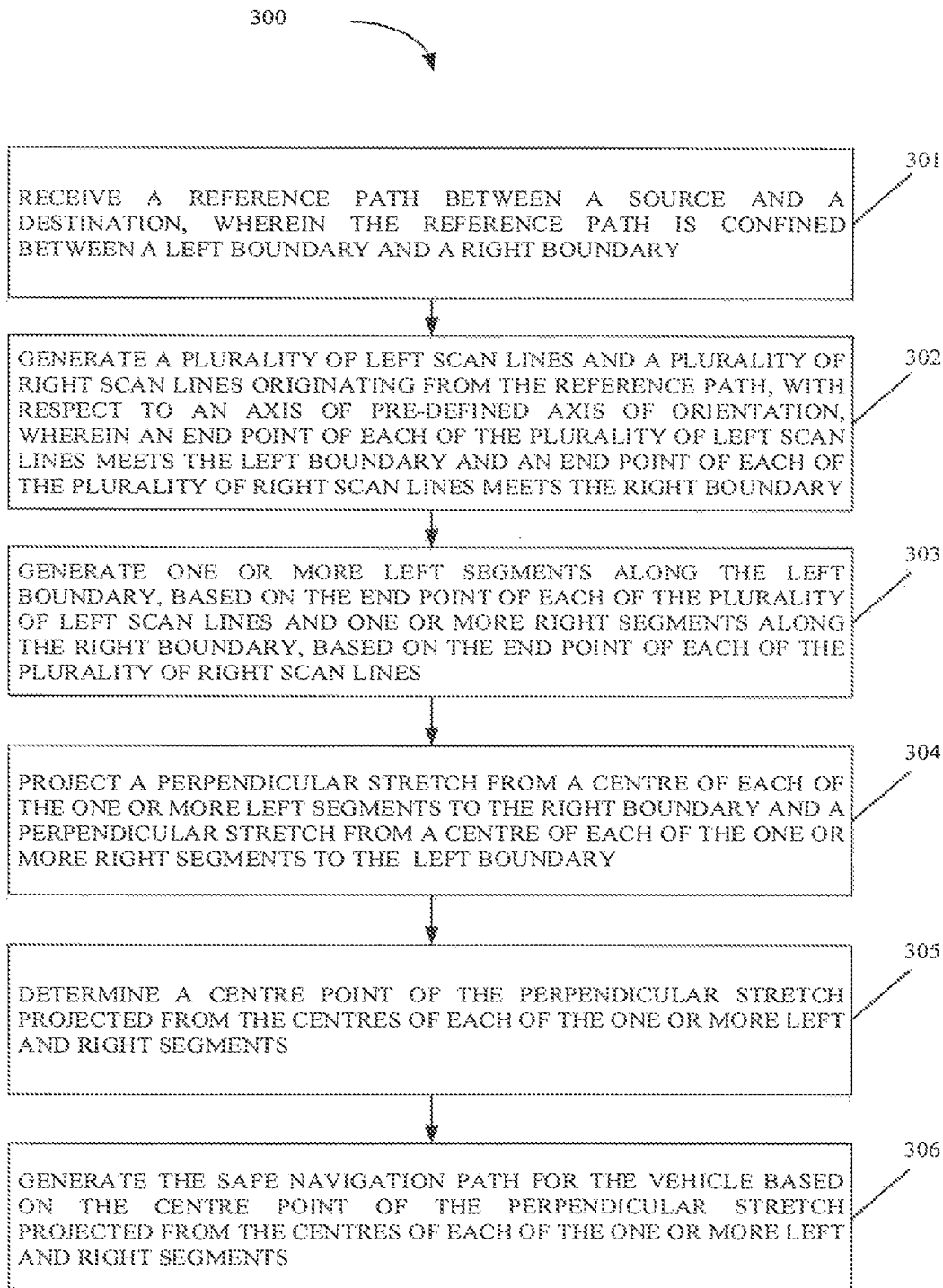
FIG. 3 shows an exemplary flow chart illustrating method steps for generating a safe navigation path for a vehicle, in accordance with some embodiments of the present disclosure.

FIG. 3 illustrates exemplary method steps for generating a safe navigation path for a vehicle, in accordance with some embodiments of the present disclosure.

As illustrated in FIG. 3, the method 300 may comprise one or more steps for generating safe navigation path for the vehicle, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, the communication module 209 receives the reference path generated by the reference path generation unit 103. The reference path comprises the left boundary and the right boundary. The reference path received by the communication module 209 is illustrated using FIG. 4.

Figure 4:
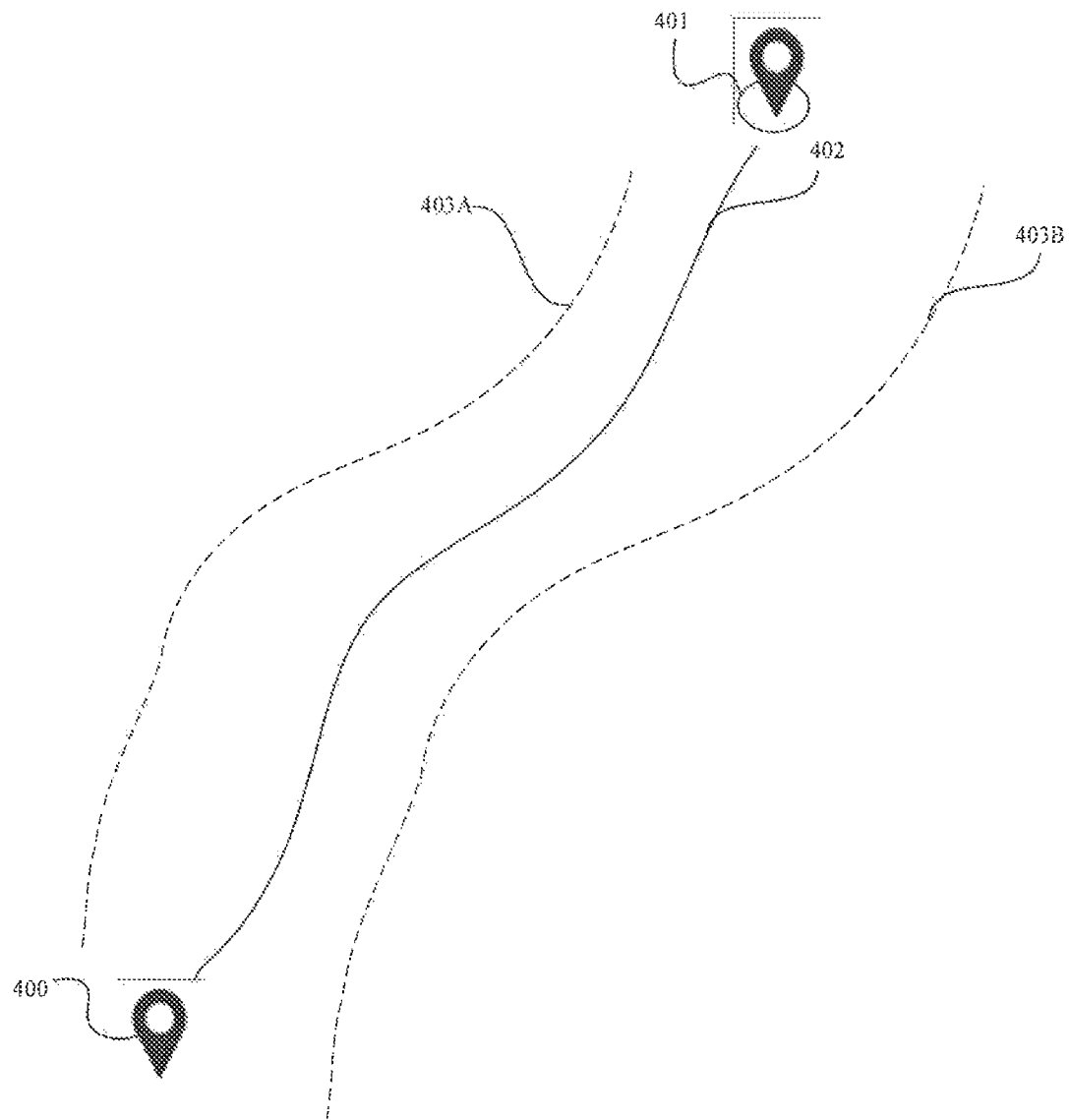
FIG. 4, FIG. 5, FIG. 6, FIG. 7A, FIG. 7B and FIG. 8 illustrates an example and the steps involved in generating a safe navigation path for a vehicle, in accordance with some embodiments of the present disclosure.

FIG. 4 illustrates the reference path received by the communication module 209. The illustrated FIG. 4 comprises a source 400, a destination 401, a reference path 402 generated from the source 400 to the destination 401, a left boundary 403A and a right boundary 403B. A road connects the source 400 to the destination 401. The left boundary 403A indicates the left edge of the road and the right boundary 403B indicates the right end of the road. The reference path 402 generated along the road may be confined between the left boundary 403A and the right boundary 403B. The left boundary 403A and the right boundary 403B are illustrated using dotted lines in the FIG. 4. The reference path 402 may be a random path generated between the source 400 and the destination 401.

Referring back to FIG. 3, at step 302, the scan lines generator 210 generates the plurality of left scan lines and the plurality of right scan lines from the reference path, with respect to an axis of pre-defined axis of rotation. The plurality of left scan lines lies on the left side of the reference path and the plurality of the right scan lines lies on the right side of the reference path. At any point on the reference path the plurality of left and right scan lines is normal to the reference path and extended towards the left boundary and the right boundary respectively. In an embodiment, the plurality of left scan lines and right scan lines may also be generated taking into consideration the orientation of the reference path.

In an embodiment, consider an instance where a road following a straight path has steep curve towards the left. In such scenario the reference path may also be oriented towards the left as the road follows a steep curve towards the left. Hence the plurality of left and right scan lines originating from the reference path along the curve may be generated in the vertical direction (positive and negative 'y' direction, considering the conventional x-y co-ordinate planes). Consider another instance, where a road follows a straight path. The reference path now has a vertical axis of orientation with respect to the road. Thus, the plurality of left and right scan lines originating from the reference path along the straight path will be generated in the horizontal direction (positive and negative 'x' direction). Further, the end point of each of the plurality of left scan lines meet the left boundary. Also, the end point of each of the plurality of right scan lines meet the right boundary. The end point of each of the plurality of left scan lines lie on the left boundary and the end point of each of the plurality of right scan lines lie on the right boundary. Generation of scan lines is illustrated using FIG. 5.

Figure 5:
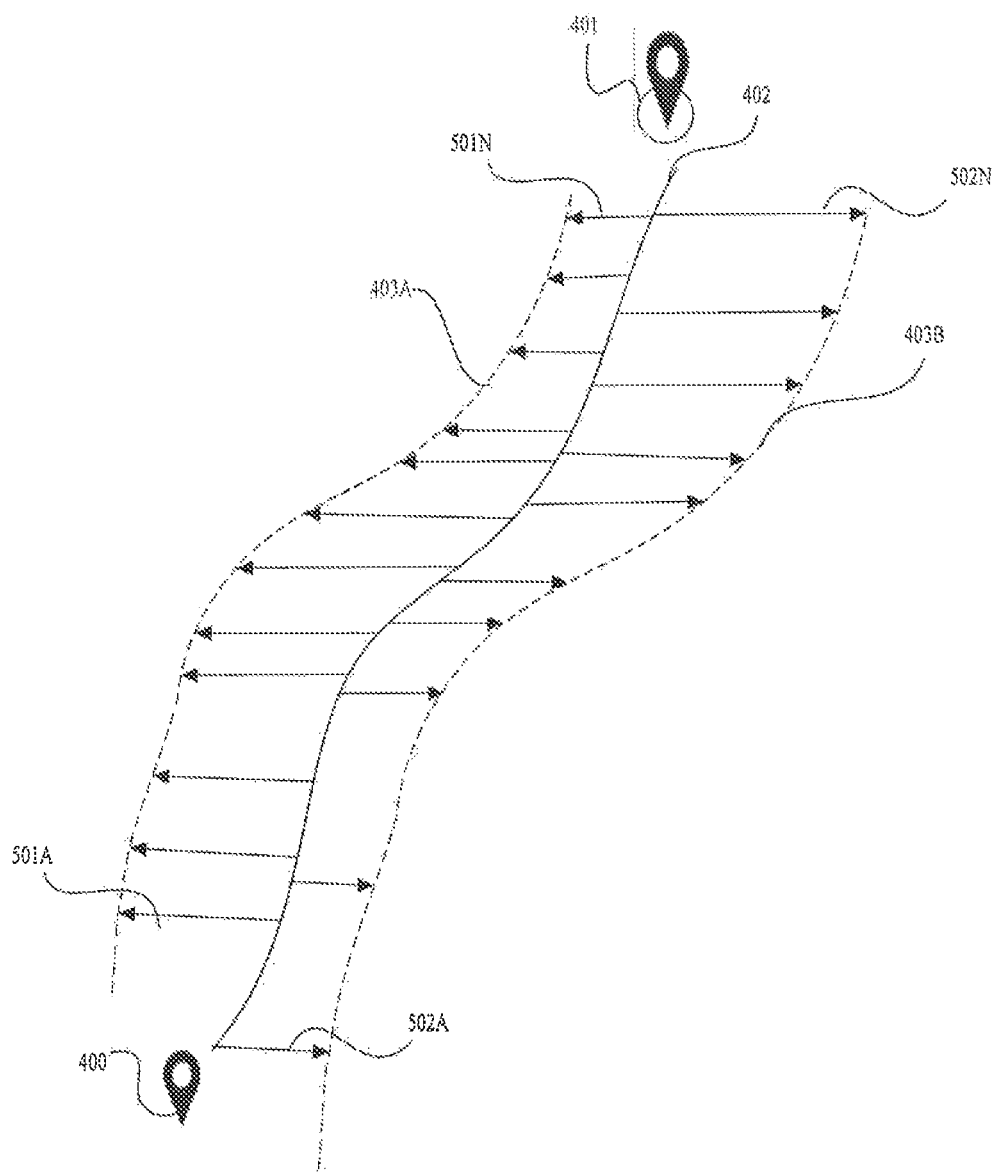

FIG. 5 illustrates generation of scan lines by the navigation path generation system 100. The illustrated FIG. 5 comprises the source 400, the destination 401, the reference path 402, the left boundary 403A, the right boundary 403B, a first left scan line 501A, . . . , a nth left scan line 501N, a first right scan line 502A, . . . , a nth right scan line 502N. The first left scan line 501A, . . . , the nth left scan line 501N may be collectively represented as plurality of left scan lines 501. The first right scan line 502A, . . . , the nth right scan line 502N may be collectively represented as plurality of right scan lines 502, The reference path 402 confined between the left boundary 403A and right boundary 403B as illustrated in FIG. 4 is received by the scan lines generator 210. The scan lines generator 210 generates the plurality of left scan lines 501 which lie on the left side of the reference path 401 and also generates plurality of right scan lines 502 which lie on the right side of the reference path 401. As illustrated in FIG. 5 the plurality of left scan lines 501 are generated in the horizontal direction (negative y direction) The plurality of right scan lines 502 are generated in the horizontal direction. Further, the plurality of left scan lines 501 originate from the reference path 402 and the end point of each of the plurality of left scan lines 501 meets or terminates at the left boundary 403A as illustrated in FIG. 5. Similarly, the plurality of right scan lines 502 originate from the reference path 402 and the end point of each of the plurality of right scan lines 502 meets or terminates at the right boundary 403B as illustrated in FIG. 5.

Referring back to FIG. 3, at step 303, the segment generator 211 generates one or more left segments and one or more right segments. The one or more left segments are generated along the left boundary based on at least the end point of each of the plurality of left scan lines. Further, the one or more right segments are generated along the right boundary based on at least the end point of each of the plurality of right scan lines.

In an embodiment, at least two end points of the plurality of left and right scan lines are connected using a straight line to generate the left segment and the right segment respectively. The angular threshold and segment length threshold present in the threshold data 206 are taken into consideration while generating each of the one or more left and right segments. Each of the one or more left and right segments may be a straight line, generated based on the deviation angle between each of the one or more left and right segments and a corresponding reference segment. Consider an instance, for generating a first left segment, an end point of a first left scan line and an end point of a second scan line is considered. An imaginary reference segment originating along the vertical or horizontal axis (depending on the orientation of the reference path) is chosen as a reference to generate the first left segment. The first left segment is a straight line generated from the end point of first left scan line present on the left boundary and joining at least another end point along the left boundary. The first left segment may be generated by connecting the end points of one or more left scan lines. While generating the first left segment the deviation angle of the first left segment with respect to the reference segment is considered. When the deviation angle between the first left segment and the reference segment is less than the angular threshold, the first left segment may be generated. Likewise, while generating a segment, angular deviation between the segment to be generated is compared with corresponding reference segment and if the deviation found to be less than the predefined threshold, the segment is generated.

In embodiment, considering the instance as mentioned above where the first segment is generated such that maximum number of end points of the one or more left scan lines fall on the first left segment. Further, consider the first left segment may be generated by connecting four end points along the left boundary. The first left segment is generated connecting the four end points, provided the deviation angle of the first left segment (connecting the four end points) from reference segment is within the angular threshold and the length of the first left segment does not exceed the segment length threshold. Similarly, for generating the second left segment, the first left segment is considered as the reference segment. Generation of second left segment is initiated from the end point where the first left segment terminates.

In another embodiment, each of one or more end points connected to form the segment may not necessarily lie on the segment. The segment may be generated in a way that maximum number of end points lie on the segment. Generation of one or more left and right segments is illustrated using FIG. 6, FIG. 7A and FIG. 7B.

Figure 6:
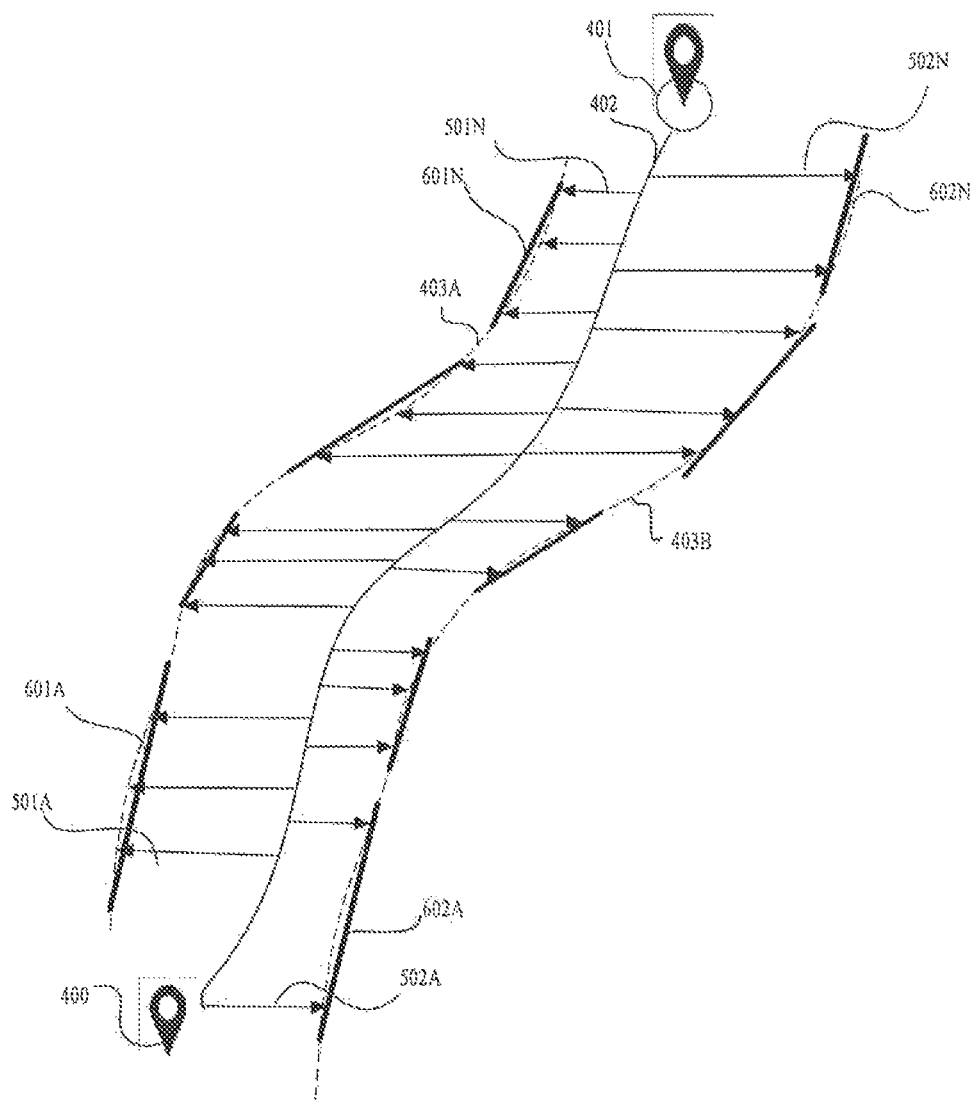

FIG. 6 illustrates generation of the one or more left segments and the one or more right segments. The illustrated FIG. 6 comprises the source 400, the destination 401, the reference path 402, the left boundary 403A, the right boundary 403B, the plurality of left scan lines 501, the plurality of right scan lines 502, a first left segment 601A . . . a nth left segment 601N, a first right segment 602A . . . a nth right segment 602N. The first left segment 601A . . . the nth left segment 601N may be collectively represented as one or more left segments 601. The first right segment 602A . . . the nth right segment 602N may be collectively represented as the one or more right segments 602. The one or more left segments 601 is generated along the left boundary 403A and the one or more right segments 602 are generated along the right boundary 403B.

Figure 7A:
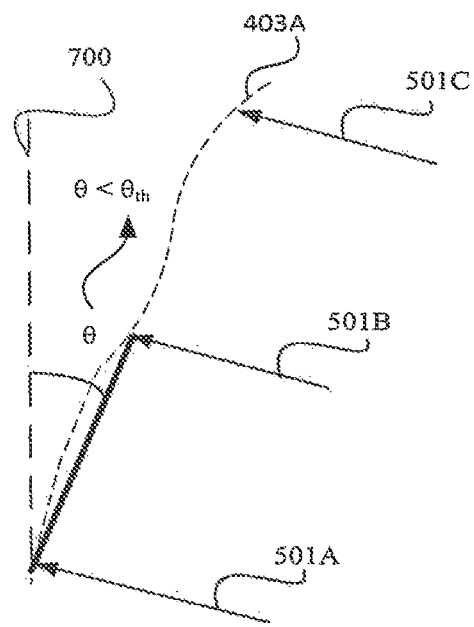
Figure 7B:
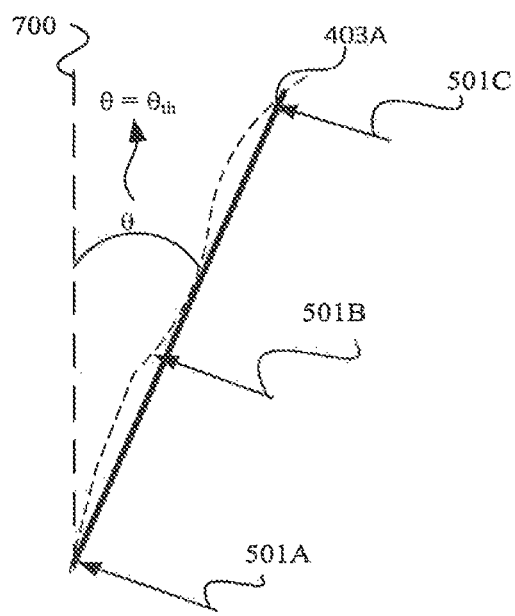

FIG. 7A, FIG. 7B illustrates the generation of the first left segment 601A. An imaginary reference segment 700 may be chosen along the vertical axis from the end point of the first left scan line 501A as illustrated in FIG. 7A. The first left segment 601A is formed by connecting the end point of the first left scan line 501A and the end point of the second scan line 501B (next end point along the left boundary 403A). Let θ denote the deviation angle between the first left segment 601A and the reference segment 700. Let $θ_{th}$ denote the angular threshold. In the first segment formed as illustrated in FIG. 6A, the θ is found to be less than $θ_{th}$.

As the θ is found to be less than $θ_{th}$, the first left segment 601A is extended to meet the end point of the third scan line 501C (next end point along the left boundary 403A) as illustrated in FIG. 7B. The first segment 601A is extended to increase the number of end point lying on the first segment 601A. Further, the deviation angle is measured between the extended first left segment and the reference segment 700. The deviation angle θ is now equal to the angular threshold $θ_{th}$. Thus, the first left segment 601A is generated joining three end points as illustrated in FIG. 6B. If the deviation angle θ between the extended first left segment 601A is more than the angular threshold the extended first left segment is neglected and the first left segment 601A as generated in FIG. 7A is considered.

In an embodiment, the second left segment 601B is generated from the point of termination of the first left segment 601A in a similar manner as illustrated in FIG. 6A and FIG. 6B, but the reference segment would now be the first left segment 601A.

Referring back to FIG. 3 at step 304, the perpendicular stretch generator 212 projects perpendicular stretches. Once the one or more left segments 601 are generated along the left boundary 403A and the one or more right segments 602 are generated along the right boundary 403B, the perpendicular stretch generator 212 projects a perpendicular stretch from a centre of each of the one or more left segments 601 to the right boundary 403B and a perpendicular stretch from a centre of each of the one or more right segments 602 to the left boundary 403A. Thereby, forming one or more perpendicular stretches.

At step 305, the centre point determination module 213, determines centre points of each of the one or more perpendicular stretches. Thereby, generating one or more centre points. Generation of perpendicular stretches and determination of centre point for each of the one or more perpendicular stretches is illustrated in FIG. 8.

Figure 8:
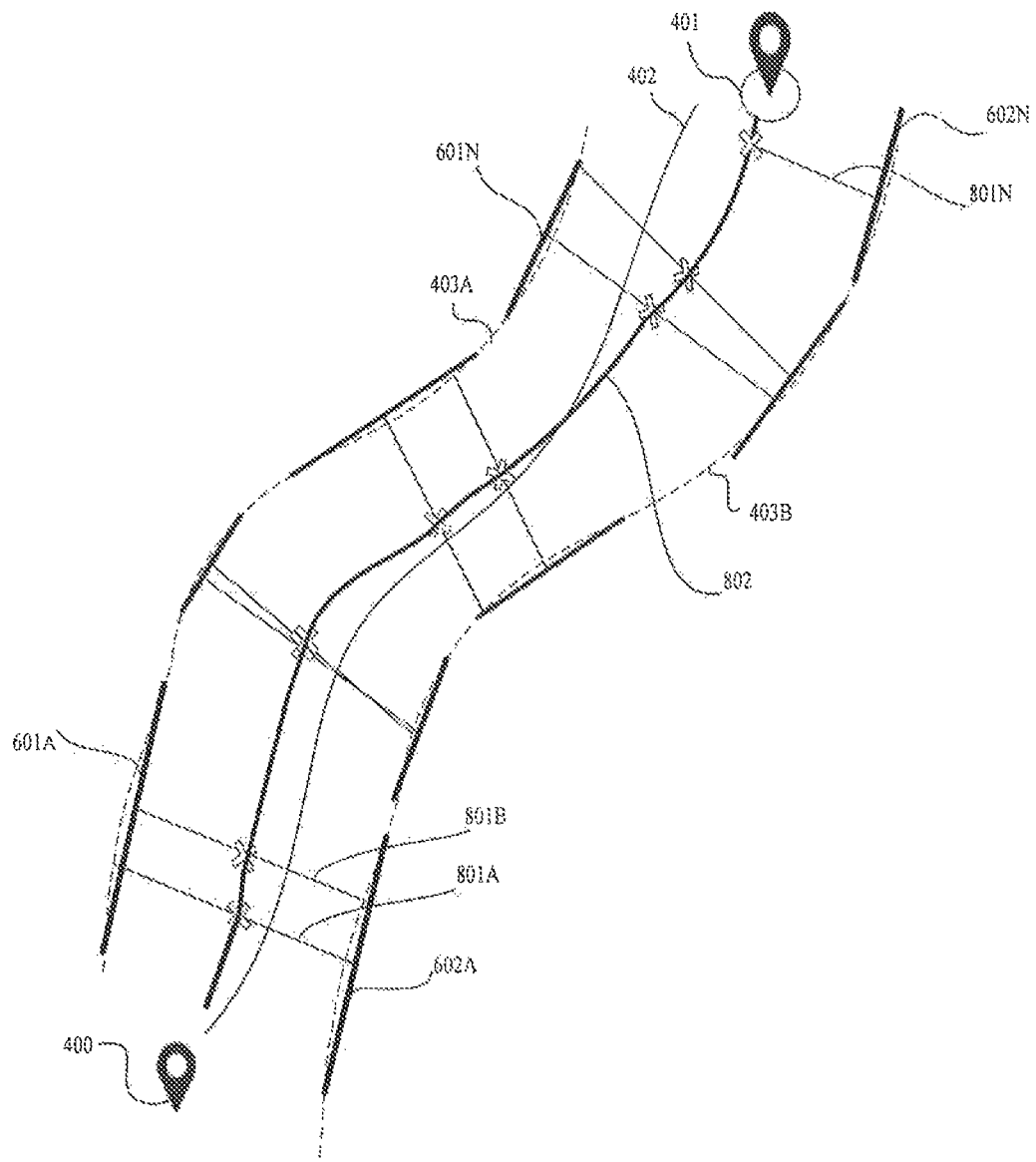

FIG. 8 illustrates the projection of perpendicular stretches and generation of the safe path. The illustrated FIG. 8 comprises the source 400, the destination 401, the reference path 402, the left boundary 403A, the right boundary 403B, the one or more left segments 601, the one or more right segments 602, a first perpendicular stretch 801A, a second perpendicular stretch 801B . . . a nth perpendicular stretch 801N, a safe navigation path 802. The first perpendicular stretch 801A, the second perpendicular stretch 801B . . . the nth perpendicular stretch 801N may be collectively represented as perpendicular stretches 801. As illustrated in the FIG. 8 the first perpendicular stretch 801A is projected from the centre of the first right segment 602A to the left boundary 403A. Similarly, the second perpendicular stretch 801B is projected from the centre of the first left segment 601A to the right boundary 403B. Similarly, a perpendicular stretch is projected from the centre of each of the one or more right segments 602 to the left boundary 403A and a perpendicular stretch is projected from the centre of each of the one or more left segments 601 to the right boundary 403B as illustrated in FIG. 8. A centre point is determined for each of the perpendicular stretches. Further, the centre point determined for each of the perpendicular stretches is illustrated by a cross mark (X) in the FIG. 8.

In an embodiment, a perpendicular stretch may be projected from the centre of each of the one or more right segments 602 to at least one of the one or more left segments 601 and a perpendicular stretch may be projected from the centre of each of the one or more left segments 601 to at least one of the one or more right segments 602.

At step 306, the safe path generation module 214, generates the safe path. The safe path may be generated by connecting the one or more centre points determined by the centre point determination module 213. In an embodiment, the one or more centre points may be curve fitted to generate the safe path along the centre of the road having a defined left boundary 403A and right boundary 403B, joining the source 400 and the destination 401. Safe navigation path generation is illustrated in FIG. 8.

As illustrated in FIG. 8, the safe navigation path 802 may be generated by curve fitting the centre point of each of the one or more perpendicular stretches.

Computer System

Figure 9:
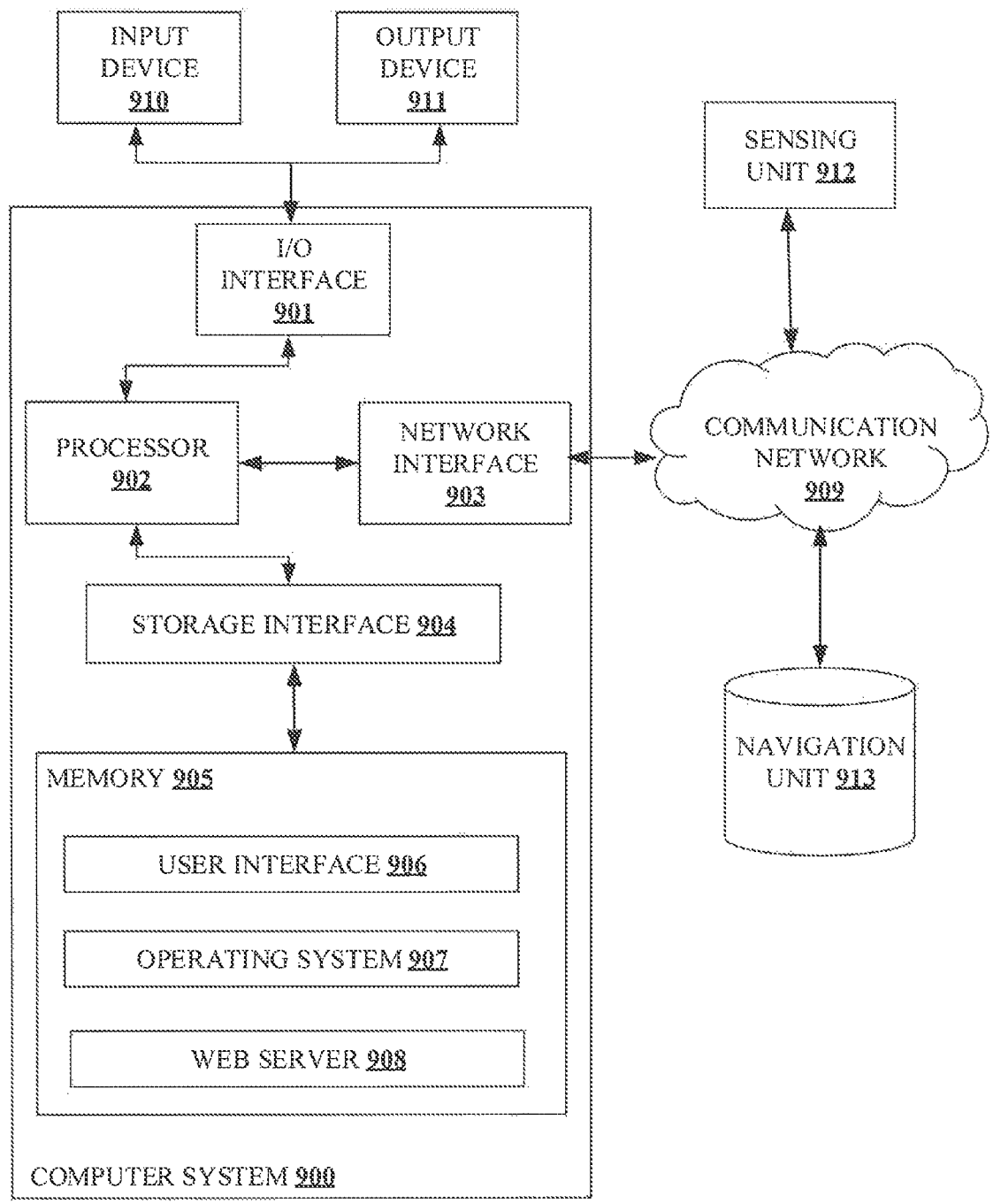
FIG. 9 illustrates a block diagram of an exemplary computer system for implementing embodiments consistent with the present disclosure.

FIG. 9 illustrates a block diagram of an exemplary computer system 900 for implementing embodiments consistent with the present disclosure. In an embodiment, the computer system 900 is used to implement the navigation path generation system 100. The computer system 900 may comprise a central processing unit ("CPU" or "processor") 902. The processor 902 may comprise at least one data processor for generating a safe navigation path for a vehicle. The processor 902 may include specialized processing units such as integrated system (bus) controllers, memory management control units, floating point units, graphics processing units, digital signal processing units, etc.

The processor 902 may be disposed in communication with one or more input/output (I/O) devices (not shown) via I/O interface 901. The I/O interface 901 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI, RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 901, the computer system 900 may communicate with one or more I/O devices. For example, the input device 910 may be an antenna, keyboard, mouse, joystick, (infrared) remote control, camera, card reader, fax machine, dangle, biometric reader, microphone, touch screen, touchpad, trackball, stylus, scanner, storage device, transceiver, video device/source, etc. The output device 911 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 900 consists of a navigation path generation system 100. The processor 902 may be disposed in communication with the communication network 609 via a network interface 903. The network interface 903 may communicate with the communication network 909. The network interface 903 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 909 may include, without limitation, a direct interconnection, local area network (LAN), wide area network (WAN), wireless network (e.g., using Wireless Application Protocol), the Internet, etc. Using the network interface 903 and the communication network 909, the computer system 900 may communicate with a sensing unit 912 and a navigation unit 913. The network interface 903 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 909 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 902 may be disposed in communication with a memory 905 (e.g., RAM, ROM, etc. not shown in FIG. 9) via a storage interface 904. The storage interface 904 may connect to memory 905 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 905 may store a collection of program or database components, including, without limitation, user interface 906, an operating system 907, web server 908 etc. In some embodiments, computer system 900 may store user/application data 906, such as, the data, variables, records, etc., as described in this disclosure. Such databases may be implemented as fault-tolerant, relational, scalable, secure databases such as Oracle® or Sybase®.

The operating system 907 may facilitate resource management and operation of the computer system 900. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™; etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 900 may implement a web browser 908 stored program component. The web browser 908 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 908 may utilize facilities such as AJAX™, DHTML™, ADOBE® FLASH™, JAVASCRIPT™, JAVA™, Application Programming Interfaces (APIs), etc. In some embodiments, the computer system 900 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 900 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

In an embodiment, the method steps 300 may be performed in real-time.

In an embodiment, the present disclosure discloses a method for generating a safe path for a vehicle along the centre of the road. Navigation of the vehicle along the safe path ensures the safety of the vehicle and the people in the vehicle especially when the vehicle is an autonomous or semi-autonomous vehicle.

In an embodiment, the present disclosure discloses a method and system for generating a safe navigation path along the centre of the road.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS:

| Reference number | Description |
|---|---|
| 100 | Navigation path generation system |
| 101 | Sensing unit |
| 102 | Vehicle localization unit |
| 103 | Reference path generation unit |
| 104 | Electronic Control unit |
| 105 | Navigation unit |
| 201 | I/O Interface |
| 202 | Memory |
| 203 | Processor |
| 204 | Data |
| 205 | Reference path data |
| 206 | Threshold data |
| 207 | Other data |
| 208 | Modules |
| 209 | Communication module |
| 210 | Scan line generator |

-continued

REFERRAL NUMERALS:

| Reference number | Description |
|---|---|
| 211 | Segment generator |
| 212 | Perpendicular stretch generator |
| 213 | Centre point determination module |
| 214 | Safe path generation module |
| 215 | Other modules |
| 400 | Source |
| 401 | Destination |
| 402 | Reference path |
| 403A | Left boundary |
| 403B | Right boundary |
| 501 | Plurality of left scan lines |
| 502 | Plurality of right scan lines |
| 601 | One or more left segments |
| 602 | One or more right segments |
| 700 | Reference segment |
| 801 | Perpendicular stretches |
| 802 | Safe navigation path |
| 900 | Computer System |
| 901 | I/O Interface of the exemplary Computer system |
| 902 | Processor of the exemplary Computer system |
| 903 | Network Interface |
| 904 | Storage Interface |
| 905 | Memory of the exemplary Computer system |
| 906 | User Interface of the exemplary Computer system |
| 907 | Operating System |
| 908 | Web Server |
| 909 | Communication Network |
| 910a, . . . , 910n | Input Devices |
| 911a, . . . , 911n | Output device |
| 912 | Sensing unit of the exemplary Computer system |
| 913 | Navigation unit of the exemplary Computer system |

What is claimed is:

1. A method for generating safe navigation path for a vehicle, the method comprising:

receiving, by a navigation path generation system, a reference path between a source and a destination, wherein the reference path is confined between a left boundary and a right boundary;

generating, by the navigation path generation system, a plurality of left scan lines and a plurality of right scan lines originating from the reference path, with respect to an axis of pre-defined axis of orientation, wherein an end point of each of the plurality of left scan lines meets the left boundary and an end point of each of the plurality of right scan lines meets the right boundary;

generating, by the navigation path generation system, one or more left segments along the left boundary, based on the end point of each of the plurality of left scan lines and one or more right segments along the right boundary, based on the end point of each of the plurality of right scan lines, wherein the generation of each the one or more left segments and right segments is further based on a pre-defined angular threshold, and a pre-defined segment length threshold, wherein each of the one or more left and right segments is a straight line, generated based on a deviation angle between the end point of each of the plurality of left and right scan lines and a corresponding reference end point indicating a beginning of the one or more left and right segments, wherein the deviation angle is lesser than the pre-defined angular threshold;

projecting, by the navigation path generation system, a perpendicular stretch from a centre of each of the one or more left segments to the right boundary and a perpendicular stretch from a centre of each of the one or more right segments to the left boundary;

determining, by the navigation path generation system, a centre point of the perpendicular stretch projected from the centres of each of the one or more left and right segments; and generating, by the navigation path generation system, the safe navigation path for the vehicle based on the centre point of the perpendicular stretch projected from the centres of each of the one or more left and right segments.

2. The method as claimed in claim 1, wherein the vehicle is an autonomous vehicle.

3. The method as claimed in claim 1, wherein the reference path is received from a static map generated using a Light Detection and Ranging (LIDAR) system.

4. The method as claimed in claim 1, wherein the plurality of left scan lines and the plurality right scan lines are generated at pre-defined length intervals of the reference path.

5. The method as claimed in claim 1, wherein the one or more left segments are generated to maximise a count of the end point of each of the plurality of left scan lines, falling on the generated one or more left segments.

6. The method as claimed in claim 1, wherein the one or more right segments are generated to maximise a count of end point of each of the plurality of right scan lines, falling on the generated one or more right segments.

7. The method as claimed in claim 1, wherein the perpendicular stretch from the centre of each of the one or more left segments is projected to at least one of the one or more right segments and the perpendicular stretch from the centre of each of the one or more right segments is projected to at least one of the one or more left segments.

8. The method as claimed in claim 1, wherein the safe navigation path is generated based on a curve fitting of the centre point of the perpendicular stretch projected from the centres of each of the one or more left and right segments.

9. A navigation path generation system for generating a safe navigation path for a vehicle, the navigation path generation system comprising;

an Electronic Control Unit (ECU), configured to:
receive, a reference path between a source and a destination, wherein the reference path is confined between a left boundary and a right boundary;
generate, a plurality of left scan lines and a plurality of right scan lines originating from the reference path, with respect to an axis of pre-defined axis of orientation, wherein an end point of each of the plurality of left scan lines meets the left boundary and an end point of each of the plurality of right scan lines meets the right boundary;
generate, one or more left segments along the left boundary, based on the end point of each of the plurality of left scan lines and one or more right segments along the right boundary, based on the end point of each of the plurality of right scan lines, wherein the generation of each the one or more left segments and right segments is further based on a pre-defined angular threshold, and a pre-defined segment length threshold, wherein each of the one or more left and right segments is a straight line, generated based on a deviation angle between the end point of each of the plurality of left and right scan lines and a corresponding reference end point indicating a beginning of the one or more left and right segments, wherein the deviation angle is lesser than the pre-defined angular threshold;
project, a perpendicular stretch from a centre of each of the one or more left segments to the right boundary and a perpendicular stretch from a centre of each of the one or more right segments to the left boundary;
determine, a centre point of the perpendicular stretch projected from the centres of each of the one or more left and right segments; and
generate, the safe navigation path for the vehicle based on the centre point of the perpendicular stretch projected from the centres of each of the one or more left and right segments.

10. The navigation path generation system as claimed in claim 9, wherein the vehicle is an autonomous vehicle, and wherein the reference path is received from a static map generated using a Light Detection and Ranging (LIDAR) system.

11. The navigation path generation system as claimed in claim 9, wherein the plurality of left scan lines and the plurality of right scan lines are generated at pre-defined length intervals of the reference path.

12. The navigation path generation system as claimed in claim 9, wherein the one or more left segments are generated to maximise a count of the end point of each of the plurality of left scan lines, falling on the generated one or more left segments.

13. The navigation path generation system as claimed in claim 9, wherein the one or more right segments are generated to maximise a count of end point of each of the plurality of right scan lines, falling on the generated one or more right segments.

14. The navigation path generation system as claimed in claim 9, wherein the perpendicular stretch from the centre of each of the one or more left segments is projected to at least one of the one or more right segments and the perpendicular stretch from the centre of each of the one or more right segments is projected to at least one of the one or more left segments.

15. The navigation path generation system as claimed in claim 9, wherein the safe navigation path is generated based on a curve fitting of the centre point of the perpendicular stretch projected from the centres of each of the one or more left and right segments.

16. A non-transitory computer readable medium including instruction stored thereon that when processed by at least one processor cause a navigation path generation system to perform operations comprising:

receiving a reference path between a source and a destination, wherein the reference path is confined between a left boundary and a right boundary;
generating a plurality of left scan lines and a plurality of right scan lines originating from the reference path, with respect to an axis of pre-defined axis of orientation, wherein an end point of each of the plurality of left scan lines meets the left boundary and an end point of each of the plurality of right scan lines meets the right boundary;
generating one or more left segments along the left boundary, based on the end point of each of the plurality of left scan lines and one or more right segments along the right boundary, based on the end point of each of the plurality of right scan lines, wherein the generation of each the one or more left segments and right segments is further based on a pre-defined angular threshold, and a pre-defined segment length threshold, wherein each of the one or more left and right segments is a straight line, generated based on a deviation angle between the end point of each of the plurality of left and right scan lines and a corresponding reference end point indicating a beginning of the one or more left and right segments, wherein the deviation angle is lesser than the predefined angular threshold;

projecting a perpendicular stretch from a centre of each of the one or more left segments to the right boundary and a perpendicular stretch from a centre of each of the one or more right segments to the left boundary;

determining a centre point of the perpendicular stretch projected from the centres of each of the one or more left and right segments; and generating the safe navigation path for the vehicle based on the centre point of the perpendicular stretch projected from the centres of each of the one or more left and right segments.

* * * * *